W. O. AMSLER.
REVERSING VALVE.
APPLICATION FILED MAR. 14, 1910.

1,080,134.

Patented Dec. 2, 1913.

3 SHEETS—SHEET 1.

WITNESSES,

INVENTOR,
Walter O. Amsler
by W. G. Doolittle
Attorney

W. O. AMSLER.
REVERSING VALVE.
APPLICATION FILED MAR. 14, 1910.

1,080,134.

Patented Dec. 2, 1913.

3 SHEETS—SHEET 2.

WITNESSES,
INVENTOR,

W. O. AMSLER.
REVERSING VALVE.
APPLICATION FILED MAR. 14, 1910.

1,080,134.

Patented Dec. 2, 1913.

3 SHEETS—SHEET 3.

WITNESSES,

INVENTOR,
Walter O. Amsler
by W. G. Doolittle
Attorney

UNITED STATES PATENT OFFICE.

WALTER O. AMSLER, OF PITTSBURGH, PENNSYLVANIA.

REVERSING-VALVE.

1,080,134.　　　　Specification of Letters Patent.　　Patented Dec. 2, 1913.

Application filed March 14, 1910.　Serial No. 549,167.

*To all whom it may concern:*

Be it known that I, WALTER O. AMSLER, a resident of Pittsburgh, in the county of Allegheny and State of Pennsylvania, have invented certain new and useful Improvements in Reversing-Valves, of which the following is a specification.

My invention relates to improvements in reversing valves for regenerating-furnaces and an object of the present invention is to provide in a unitary structure a combined gas and air valve mechanism designed for controlling both gas and air.

Another object of the present invention is the provision of means whereby much of the gas now wasted in the operation of regenerative furnaces may be saved, and especially during the reversing operations of the valve.

In the embodiment of my invention as illustrated by the drawings, I have shown a water sealed rotative valve mechanism for controlling the passage of both air and gas to and from the regenerators all embraced in a single mechanism in place of two or more separate and distinct mechanisms as has heretofore been the case.

Figure 1:
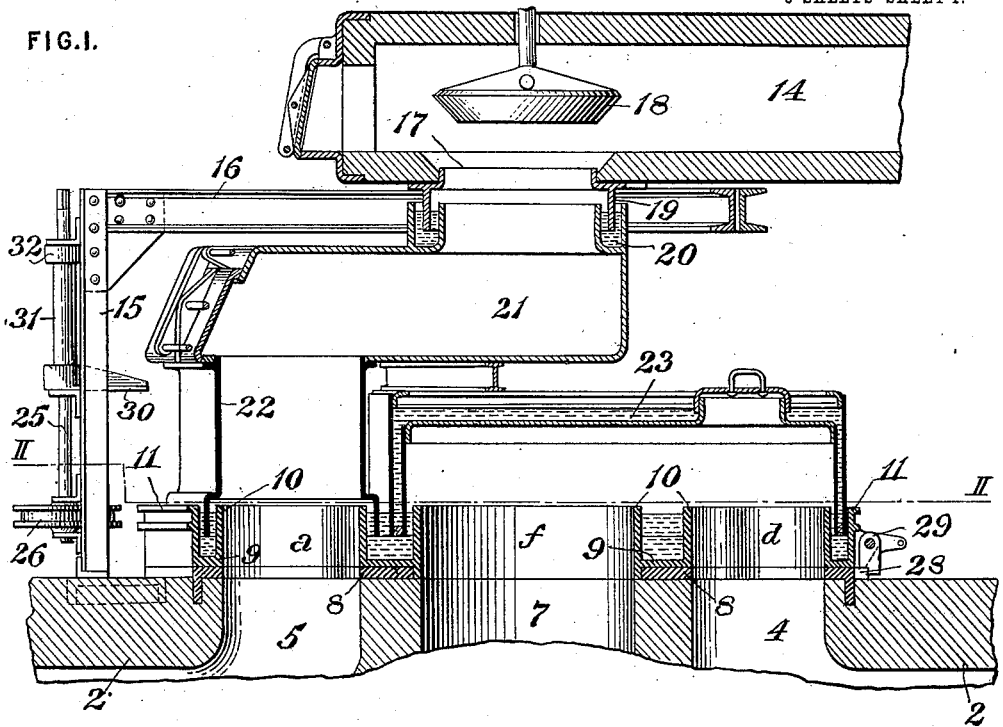
Figure 2:
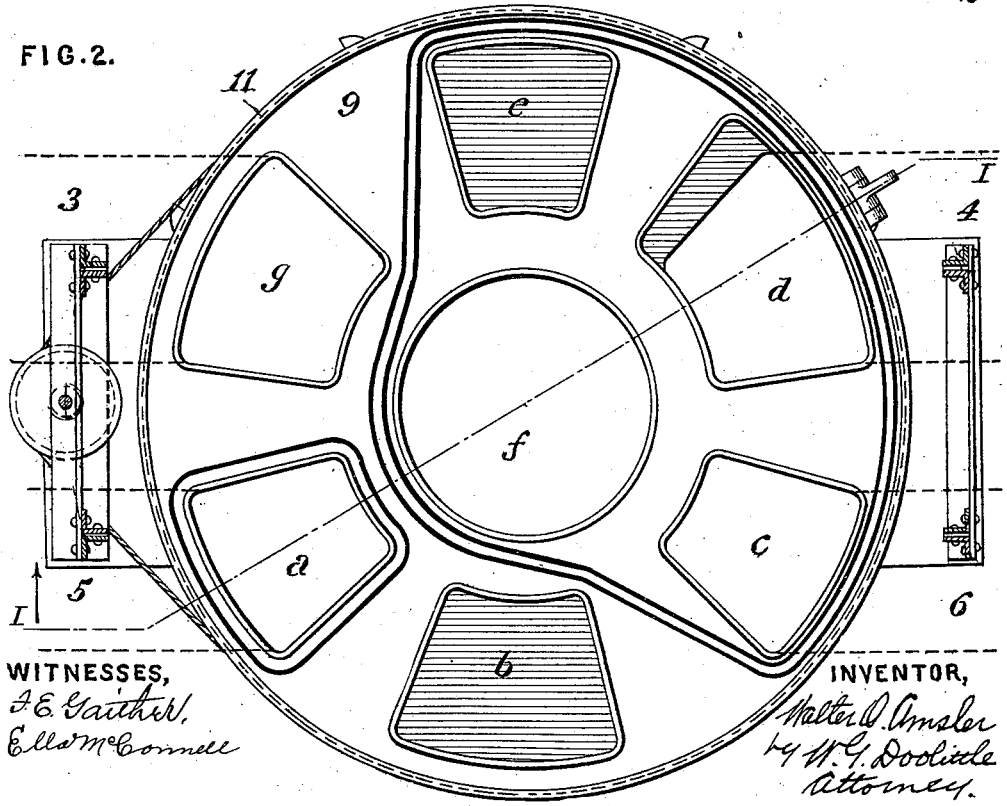
Figure 3:
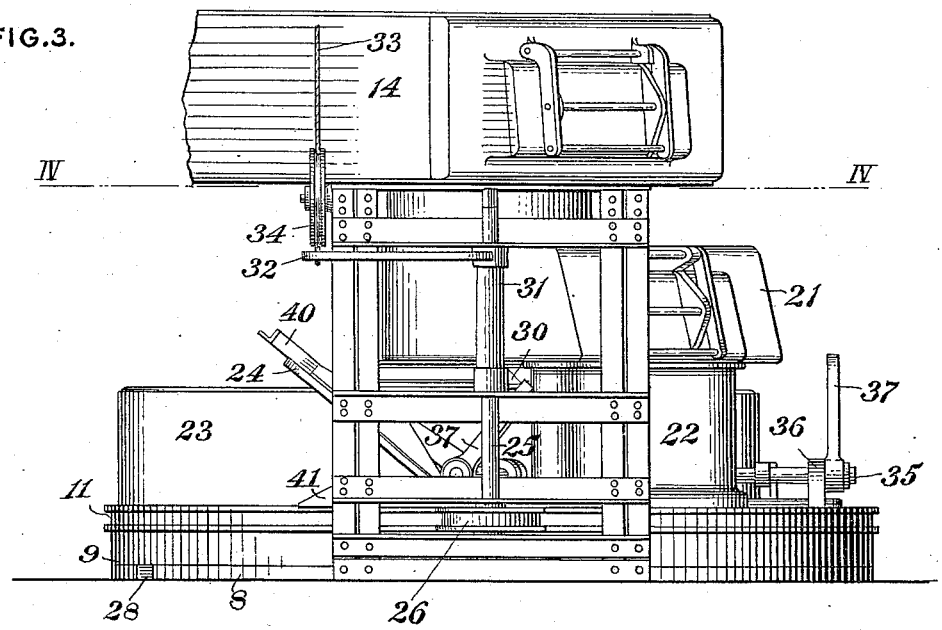
Figure 4:
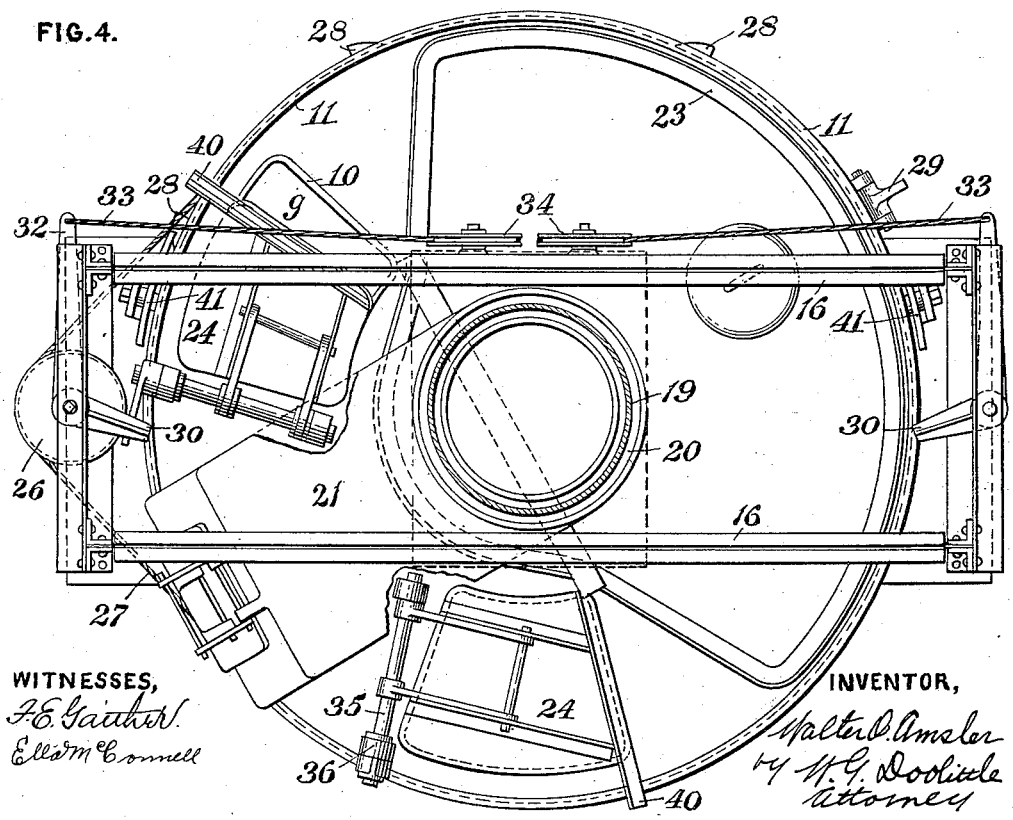
Figure 5:
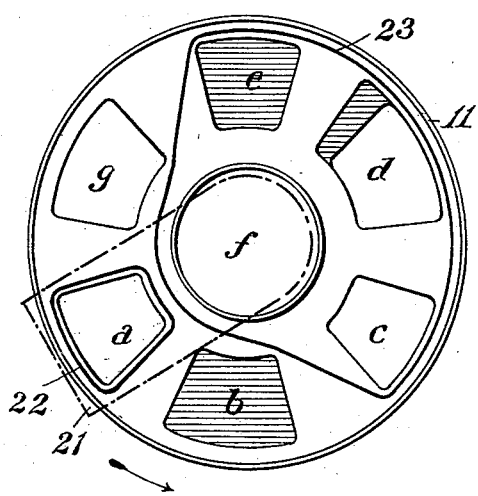
Figure 6:
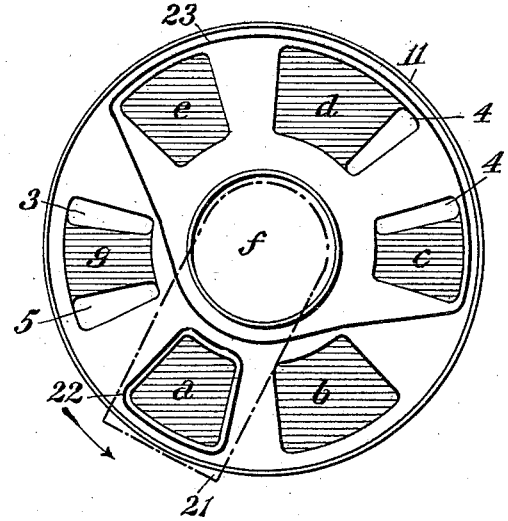
Figure 7:
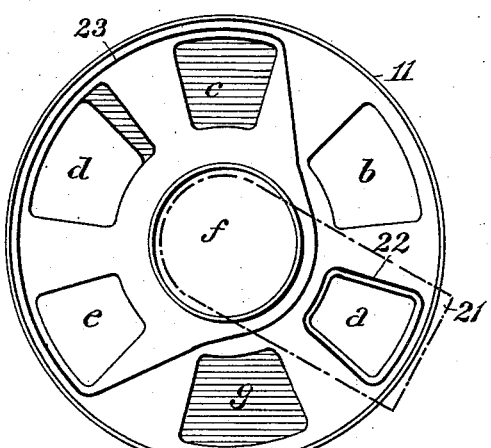
Figure 8:
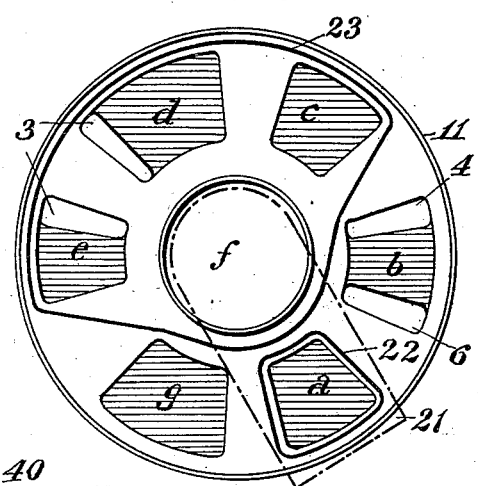
Figure 9:
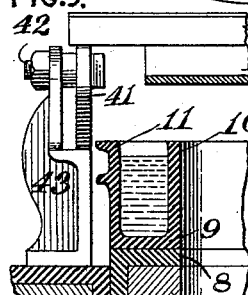

In the accompanying drawings, which illustrate an application of my invention, Figure 1 is a vertical sectional view of a reversing valve embodying my invention the section being taken on line I—I of Fig. 2; Fig. 2 is a horizontal sectional view taken on line II—II of Fig. 1; Fig. 3, an elevational view; Fig. 4 a top plan taken below line IV—IV of Fig. 3; Figs. 5, 6, 7, and 8, diagrammatic views showing different operative positions assumed by some parts of the valve mechanisms on reversal of the valve; Fig. 9, a detail sectional view taken on line IX—IX of Fig. 10; and Fig. 10, a detail side elevational view of an air-door and door operating means.

Referring to the drawings the air and gas flues leading to the respective regenerators and the common chimney flue are all formed in masonry 2, and, as illustrated, the air flues 3 and 4 and the gas flues 5 and 6 are arranged around the central chimney flue 7, which latter is designed to receive the exhausts from both the air and gas flues of the respective regenerators.

Located on top of the masonry and provided with a series of openings corresponding in number and form with the flues or ports 3, 4, 5, 6, and 7, is a stationary plate member or seat 8. Ported member 8 is designed to form a seat for a rotatable member 9. Member 9 is provided with a series of ports designed for the passage of air and gas and also with upwardly extending flanges 10 surrounding the respective openings or ports. Said member is further provided with an annular flange 11, and member 9 together with its flanges forms a receptacle for holding a body of water employed for sealing and cooling purposes.

The number of ports in the movable member 9 is greater than the number in the fixed plate 8, in the latter I provide five ports and in the former seven, namely, $a$, $b$, $c$, $d$, $e$, $f$, and $g$.

14 designates a gas-box supported by metallic framing comprising the upright members 15 and cross-member 16. Gas-box 14 is provided with a seat opening 17 for valve 18 and with a depending annular flange 19 having the lower edge thereof immersed in a water seal, the water thereof being carried in a trough 20 located on the upper end of a gas conductor 21. Conductor 21 is provided with a downwardly extending pipe member 22 having its lower end entered into a water seal of and covering port or opening $a$ of the movable plate member 9.

Located over and adapted to cover ports $c$, $d$, $e$, and $f$ of plate 9 is a water cooled hood 23. This hood is designed to convey the exhaust from the air and gas generator-flues to the chimney through the common chimney port $f$ of member 9 and chimney-flue 7. Two of the ports $b$ and $g$ or the air ports of plate 9 are each provided with a door 24 adapted to be opened and closed during the movement of member 9 in the operation of reversing.

The rotatable plate and the other rotating parts of the single rotatable valve device may be moved by any suitable means; the means for this purpose as shown comprise a drive-shaft 25 designed to be driven by a suitable motor, not shown, a wheel 26 mounted on the lower end of the shaft, and a rope or cable 27 extending around and secured to the member 9. The movement of the rotative valve device is controlled by a series of stops 28 provided on the fixed plate by means of a catch device 29 carried on the movable member 9.

The opening of each of the doors 24 controlling the air ports of the movable member 9 is effected by similar means, and as illustrated, these means comprise an arm 30 carried on the lower end of a sleeve 31, the latter being loosely mounted on the drive-shaft 25. Secured to the upper end of sleeve 31 is a second arm or lever 32 having connected therewith a rope 33 which latter extends under a pulley wheel 34 and from said wheel to an adjusting device, not shown, convenient to the operator.

The doors are each hinged on a shaft 35 having its bearings 36 secured to the plate 9. Extending upwardly from shaft 35 is a lever or striking arm 37 adapted to make engagement with arm 30. It will be understood that as the valve device is rotated or partially rotated arm 37 will come in contact with arm 30 and cause the door to open. The attached rope 33 secured to the lever 32 exerts a force in opposition to the force exerted by the arm 37 thereby causing said arm 37 when it makes contact with arm 30 to descend. After arm 37 is freed from arm 30 the door will drop into closed position. The extent of opening of the door relative to the plate is controlled by the rope 33.

An important feature of the present invention is the provision of means whereby the unconsumed gas remaining in a regenerator and a regenerator gas-flue, immediately after a partial reversal or during the operation of reversing the valve device, is conveyed to the furnace and there utilized instead of escaping through the chimney flue and being wasted as has heretofore been the case. In order to accomplish this important step I arrange the air port $g$ of member 9 so that during the intermediate position of reversal, or the position of the parts as shown in the diagrammatic view of Fig. 6, said port $g$ will overlap both the air and gas openings in the fixed plate and the air and gas regenerator flues leading to one side of the furnace thereby enabling air to be conveyed down through said flues and force the unconsumed gas back into the furnace. During this intermediate position the ports $c$ and $d$ partly register with the air-regenerator-flue leading to the opposite side of the furnace, thus maintaining a sufficient draft, in connection with the chimney to draw the air down through the air and gas regenerator-flues and force the unconsumed gas into the furnace. This same step is accomplished with respect to the opposite side of the furnace as clearly shown diagrammatically by Figs. 7 and 8.

Figure 10:
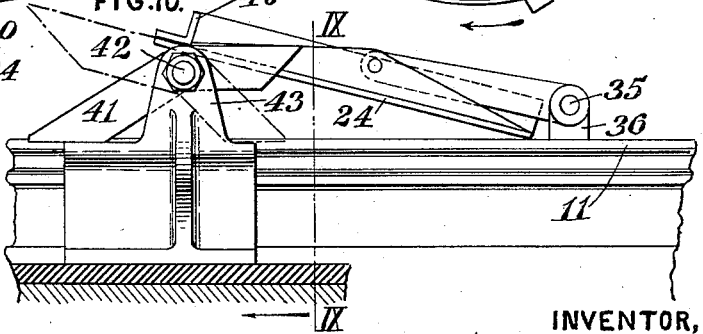

For the purpose of opening the doors controlling the admission of air through the openings $b$ and $g$ of plate 9 during the steps last mentioned, I provide the doors with a projecting member 40 and provide a tilting mechanism as particularly shown by Figs. 9 and 10, designed to engage the respective members 40 and to open said doors at the proper time. The means shown comprise a pawl 41 mounted on a pin 42 projecting inwardly from a bracket 43.

So far as I am aware, I am the first to provide a single valve device for controlling both air and gas to the respective regenerators, and also to provide a common chimney flue for the exhaust from the respective regenerators. While I have shown and described in my single valve device rotative elements or members operable to effect the passage of air and gas to the regenerators and the exhaust therefrom, I do not desire to limit myself to rotative members only for other movable members might be employed in place of the rotative members or elements shown and described.

What I claim is:

1. In a combined air and gas reversing valve mechanism, the combination with a plurality of regenerator-flues and a chimney-flue, of a single valve device for controlling both air and gas comprising a movable member having separate regenerator-ports and a common chimney-port operable in one position to admit air and gas to two regenerator-flues and a co-acting-hood to effect an exhaust from two regenerator-flues, and means for moving the valve device.

2. In a combined air and gas reversing valve mechanism, the combination with a plurality of regenerator-flues and a common chimney-flue, of a single valve device for controlling both air and gas comprising a movable member having separate regenerator-ports and a common chimney-port operable in one position to admit the air and gas to two regenerator-flues and to effect an exhaust from two regenerator-flues to a common chimney-flue.

3. In a combined air and gas reversing valve mechanism, the combination with air and gas regenerator-flues and a common chimney-flue, of a single valve device for controlling the passage of both air and gas, comprising rotative members operable in one position to admit air and gas to two regenerator-flues and to effect an exhaust from two regenerator-flues to the common chimney-flue, means for moving the rotative members to another position to cut off the gas supply, said rotative members in the second position being operable to admit air to two of the regenerators while maintaining the exhaust from another regenerator to the common chimney-flue.

4. In a combined air and gas reversing valve mechanism, the combination with regenerator-flues and a common chimney-flue, of a single rotative valve device for controlling the passage of both air and gas comprising a plate-member having openings therein, a gas-conductor, a hood connecting two of the regenerator-flues with the common chimney-flue, and means for rotating the valve device.

5. In a combined air and gas reversing valve mechanism, the combination with air and gas regenerator-flues and a common chimney-flue, of a fixed plate having openings registering with the flues, of a single rotative valve device for controlling both air and gas comprising a rotatable plate having air and gas openings therein in excess of the number of openings in the fixed plate, a movable member in communication with a gas-supply and adapted to connect with a gas regenerator-flue, a hood for connecting an air and a gas-regenerator-flue with the chimney-flue, and means for rotating the valve device.

6. In a combined air and gas reversing valve mechanism, the combination with air and gas regenerator-flues and a common chimney-flue, of a fixed plate member having air and gas openings registering with the air and gas regenerator-flues, of a single rotative valve device for controlling the passage of both air and gas comprising a rotatable plate having air and gas openings, said air openings of the rotatable plate being of greater area than the gas openings of the fixed plate and arranged so that upon a partial reversal of the valve device an air opening of the rotatable plate will be brought into communication with an air and a gas opening of the fixed plate.

7. In a combined air and gas reversing valve mechanism, the combination with air and gas regenerator-flues and a common chimney-flue, of a single valve device for controlling the passage of both air and gas, comprising movable members operable in one position to admit air and gas to two regenerator-flues, and to effect an exhaust from two regenerator-flues to the common chimney-flue, means for moving the movable members to another position to cut off the gas supply, said members in the second position being operable to admit air only to two of the regenerators, while maintaining an exhaust from another regenerator to the common chimney-flue.

8. In a combined air and gas reversing valve mechanism, the combination with a plurality of regenerator-flues, of a fixed plate having apertures registering with said flues, a single valve device for controlling both air and gas comprising a movable member having openings therein in excess of the number of openings in the fixed plate, and means for moving the movable member.

9. In a combined air and gas reversing valve mechanism, the combination with a plurality of regenerator-flues and a common chimney-flue, of a fixed plate having apertures registering with said flues, a single valve device for controlling both air and gas comprising a rotatable member having openings therein in excess of the number of openings in the fixed plate, and means for moving the rotatable member.

10. The combination with a plurality of regenerator-flues and a common chimney-flue, of a fixed plate having separate regenerator-ports and a common chimney-port respectively registering with the regenerator and chimney-flues, of a rotatable member movable upon the fixed plate having separate regenerator-ports and a common chimney-port, and means for moving the rotatable member.

11. In a combined air and gas reversing valve mechanism, the combination with a plurality of regenerator-flues and a chimney-flue, of a single valve device for controlling both air and gas comprising a movable member having separate regenerator-ports and a common chimney-port.

12. In a combined air and gas reversing valve mechanism, the combination with air and gas regenerator-flues and a chimney-flue, of a fixed plate member having ports registering with the flues, of a single rotative valve device for controlling the passage of both air and gas comprising a rotatable plate having air and gas ports with one of said air ports of greater area than any port of the fixed plate and adaptable upon a rotative movement of the valve device to register with two ports of the fixed plate, and means for moving the rotatable valve.

13. In a combined air and gas reversing valve mechanism, the combination with a plurality of regenerator-flues, a single valve device for controlling both air and gas comprising a movable member having openings therein in excess of the number of flue openings, and means for moving the movable member.

14. In a combined air and gas reversing valve mechanism, the combination with a plurality of regenerator-flues, a single valve device for controlling hot air and gas comprising a movable member having openings therein in excess of the number of regenerator flue-openings, a hood, and means for moving the movable member.

In testimony whereof I affix my signature in presence of two witnesses.

WALTER O. AMSLER.

Witnesses:
A. C. WAY,
W. G. DOOLITTLE.

---

Copies of this patent may be obtained for five cents each, by addressing the "Commissioner of Patents, Washington, D. C."